No. 620,420. Patented Feb. 28, 1899.
C. H. COSBY.
STOVE.
(Application filed Apr. 27, 1898.)
(No Model.) 2 Sheets—Sheet 1.

Witnesses
Franck L. Ornaud
Harry L. Gould

Inventor
Chas. H. Cosby,
By W. M. Tallmadge Attorneys

THE NORRIS PETERS CO., PHOTO-LITHO., WASHINGTON, D. C.

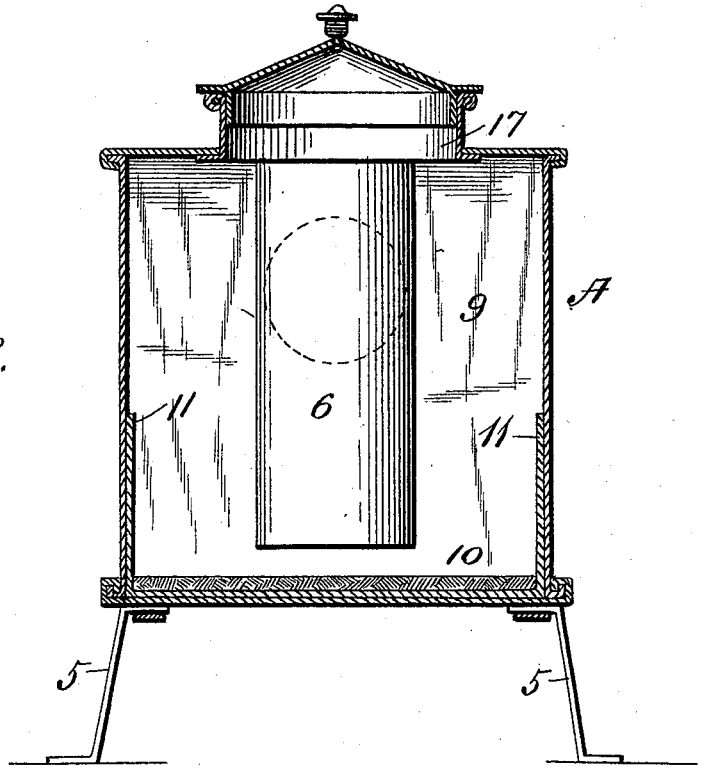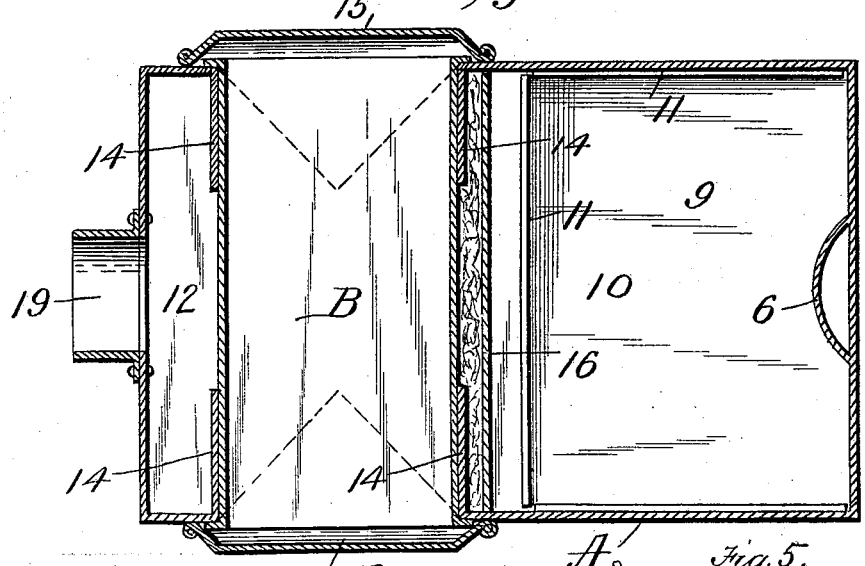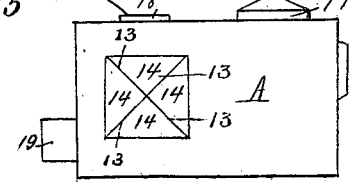

UNITED STATES PATENT OFFICE.

CHARLES HENRY COSBY, OF RICHMOND, VIRGINIA.

STOVE.

SPECIFICATION forming part of Letters Patent No. 620,420, dated February 28, 1899.

Application filed April 27, 1898. Serial No. 679,001. (No model.)

*To all whom it may concern:*

Be it known that I, CHARLES HENRY COSBY, a citizen of the United States, residing at Richmond, in the county of Henrico and State of Virginia, have invented new and useful Improvements in Stoves, of which the following is a specification.

My invention relates to an improvement in stoves designed to use wood as fuel, the object of the invention being to simplify the construction and increase the efficiency of such stoves.

The invention will first be described in connection with the accompanying drawings, and then pointed out in the claims.

Figure 1:
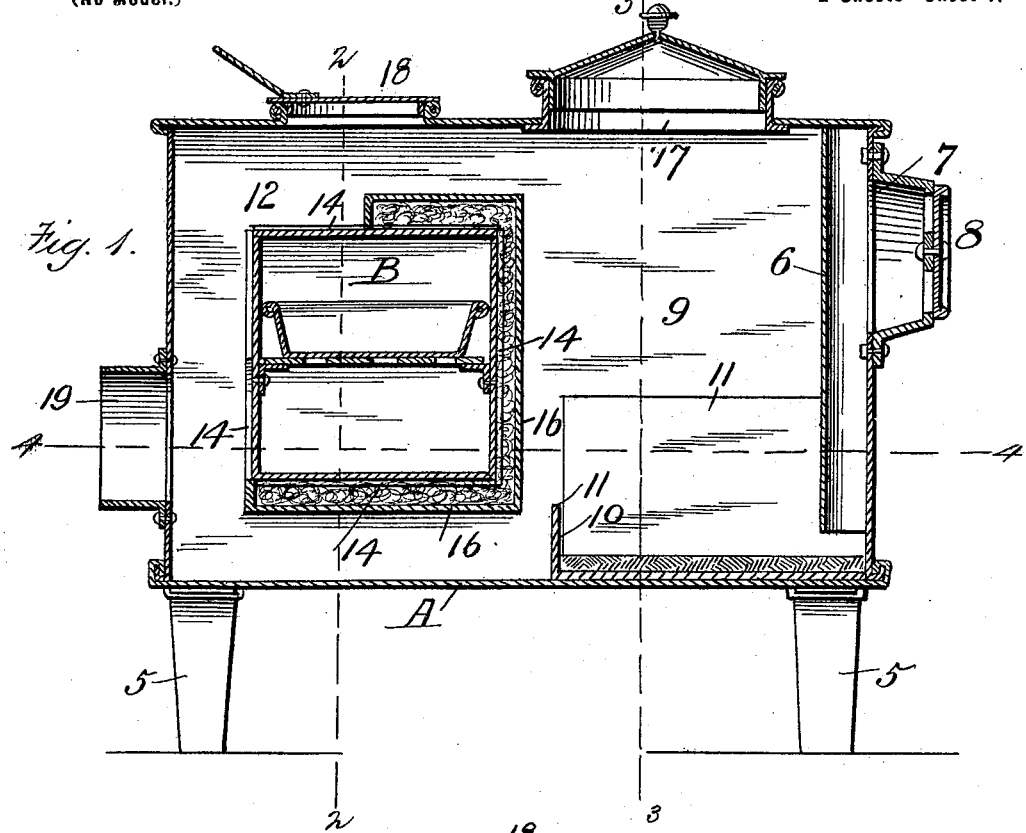
Figure 2:
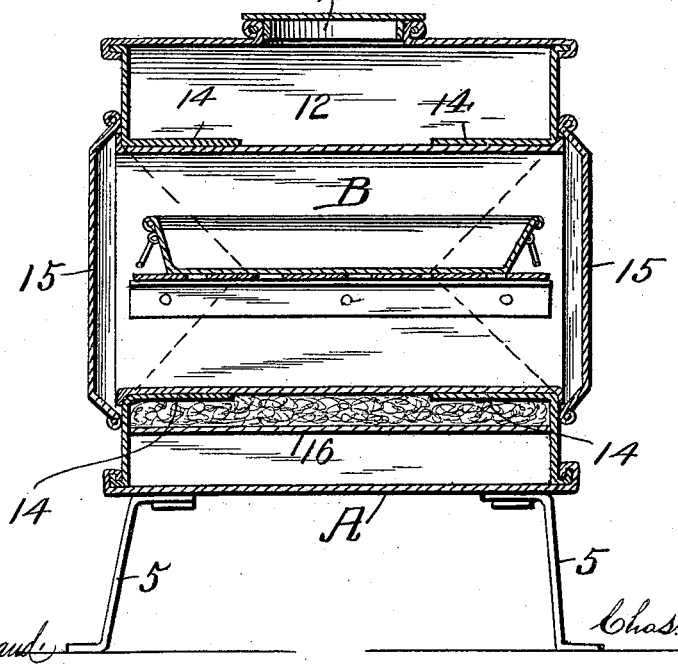

Figure 1 of the drawings is a longitudinal central section of the stove. Fig. 2 is a sectional view on the line 2 2, Fig. 1. Fig. 3 is a sectional view on the line 3 3, Fig. 1. Fig. 4 is a sectional view on the line 4 4, Fig. 1. Fig. 5 is a view in diagram, illustrating the manner of cutting the stove-casing to receive the oven.

Referring to the drawings, A represents the stove-casing, being preferably of air-tight construction, as usual in stoves of this character, and provided with legs 5, bolted or otherwise secured to the casing.

To the forward wall of casing A, I secure a draft-flue 6, the latter opening at the lower end into the fire-chamber and being in communication with the outside through an opening 7, the draft being controlled by the usual regulatable damper 8.

In the forward portion 9 of the stove-casing, hereinafter termed the "fire-chamber," I place a fire-box 10, being a thin metal plate with upturned sides and rear end, as at 11, the bottom of the box being coated with mortar or the like, thus making an added thickness of metal between the casing and fire. The fire-box may be removable or riveted in place, as desired.

The rear portion 12 of the stove-casing, hereinafter termed the "heating-chamber," is adapted to contain the oven B. The oven is held in place in the following manner: The casing is cut at 13 on the diagonals of a square equal in size to the size of the oven, these triangularly-shaped flaps 14 being bent inward to form spring-flanges between which the oven is supported, the flanges snugly embracing the ends of the oven and securing the same removably in place. One or more doors 15 may be secured to the casing for convenient access to the oven, as shown.

16 represents a heat-shield extending entirely across the stove-casing and positioned between the fire-chamber and the oven. The top of this shield extends a portion of the width of the oven, and the bottom of the shield extends the entire width of the oven, the ends being bent toward and into contact with the oven, as shown in Fig. 1. The space between the oven and the shield is filled with asbestos or similar non-conductor of heat, as shown, enabling the oven to be evenly heated, as will be evident.

Covered opening 17 above the fire-chamber serves for the introduction of fuel. Opening 18 above the oven may be utilized for cooking in the usual manner. The products of combustion escape through an opening 19 in the rear wall of the stove-casing.

Having thus described my invention, what I claim as new, and desire to secure by Letters Patent, is—

1. In a stove, a stove-casing, a fire-box located in the forward portion of the casing, an oven supported in rear of the fire-box, the sides of the casing being cut and bent to form flanges adapted to support the oven on all sides, substantially as described.

2. In a stove, a stove-casing, a fire-box located in the forward portion of the casing, a square oven supported in rear of the fire-box and flanges formed integral with the casing and bent inward to support the oven, said flanges being formed by cutting the casing on the diagonals of a square portion of the stove-casing equal in size to the oven.

3. In a stove, a stove-casing, a fire-box located in the forward portion of the casing, an oven supported in rear of the fire-box, the sides of the casing being cut and bent to form flanges adapted to support the oven on all sides, and a heat-shield between the oven and fire-box and entirely supported by the oven, substantially as described.

In testimony whereof I have hereunto set my hand in presence of two subscribing witnesses.

CHARLES HENRY COSBY.

Witnesses:
 JNO. B. GAYLE,
 HERBERT NUCKOLS.